Oct. 9, 1934.  H. T. WHEELER  1,975,886

PLASTIC PACKING STUFFING BOX

Filed Dec. 22, 1930   2 Sheets-Sheet 1

INVENTOR.

Harley T. Wheeler

Oct. 9, 1934.  H. T. WHEELER  1,975,886
PLASTIC PACKING STUFFING BOX
Filed Dec. 22, 1930  2 Sheets-Sheet 2

INVENTOR.
Harley T Wheeler

Patented Oct. 9, 1934

1,975,886

UNITED STATES PATENT OFFICE 1,975,886

PLASTIC PACKING STUFFING-BOX

Harley T. Wheeler, Dallas, Tex.

Application December 22, 1930, Serial No. 504,070

7 Claims. (Cl. 286—38)

My invention relates to improvements in applying plastic packing to stuffing-boxes and its chief advantage is a capability of securing a tight joint under high pressures when subjected to excessive temperatures or adverse chemical reaction.

This particular invention consists of forming right and left-hand helical grooves in the surface of a stuffing-box and shaping them so that the plastic packing injected will maintain a tight joint under the extremes of quick rise and fall of pressure in the presence of harsh media, by properly maintaining the density and position of the plastic material.

A further advantage of this invention is the use of a spring-loaded reservoir to inject or withdraw packing from the grooves, according to the vibration or position of the rod.

A still further and important advantage is the use of a sampler connected to an injection point in the grooves, whereby samples of the packing in use can be withdrawn and examined, coincident with the injection of new packing, without stopping the machine.

Further objects and advantages of this invention will appear with the description of the construction which follows, accompanied by the drawings, wherein.

Figure 1:
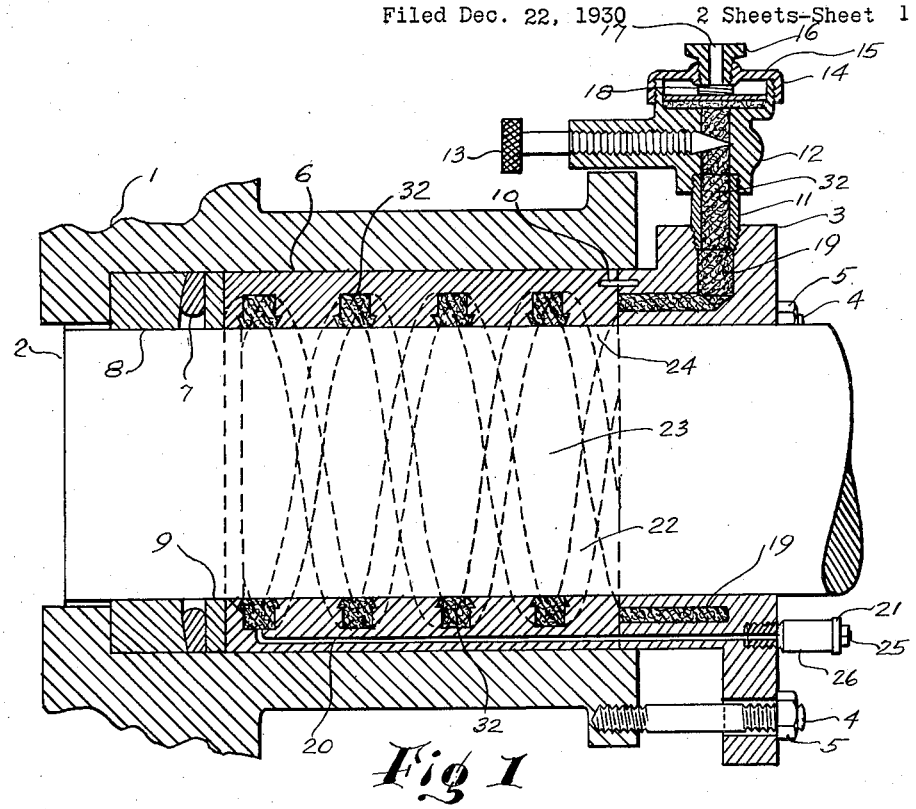
Figure 1 is a cross-section of a stuffing-box constructed according to this invention.

Referring now especially to Figure 1, a representation of a reciprocating plunger or rod in a stuffing-box built according to this invention; the frame extension 1 contains the stuffing-box chamber into which the plunger 2 travels to compress a liquid for example, the plunger 2 being guided and aligned by the bushing 8. A sleeve 6 is the plastic container used in this device and has a loose fit in the stuffing-box chamber 1, being held in place by the gland 3. Gland 3 is tightened by the studs 4 and the nuts 5.

Figure 2:
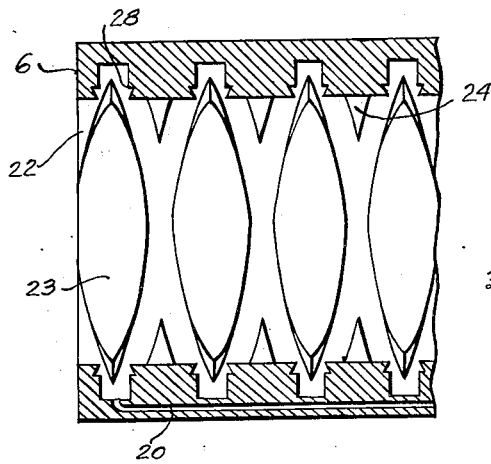
Figure 2 is a cross-section of the plastic container.

Before completing the description of the assembly as shown in Figure 1, it appears necessary to refer to Figure 2, a lengthwise cross-sectioning of the sleeve 6. A series of right and left hand multiple square grooves are formed in the bore of the sleeve 6 making the grooves 22 and leaving the lands 23 and 24 between the grooves. The face of each groove which is directed toward the pressure is cut at an acute angle with the surface of the plunger, forming a sharp lip. If the range is from vacuum to pressure, a lip will be formed on each of the opposing faces. The projection of this lip is shown on one groove only to avoid confusion of dotted lines. A passage 20 is made the entire length of the sleeve 6 and connected to the grooves 22 at a convenient point near the source of pressure. The passage 20 does not intersect any other portion of the grooves nor the outer surface of the sleeve 6.

Figure 3:
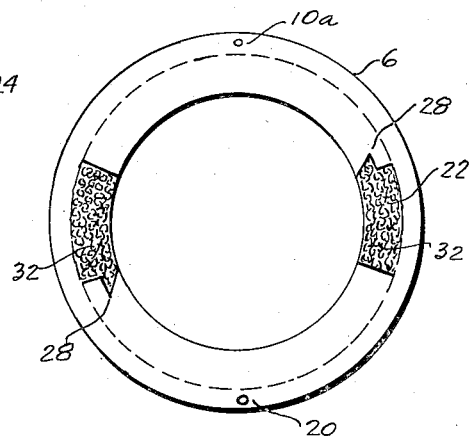
Figure 3 is an end view of the plastic container.

Returning now to Figure 1, a disc 9 having clearance around the plunger 2 and being a loose fit to the stuffing-box chamber 1, is inserted before the sleeve 6 to close the intersection of the grooves 22 with the end of the sleeve 6, such intersections being indicated in Figure 3. A gasket 7 is inserted between the disc 9 and the guide bushing 8 to make a pressure tight joint between the bottom of the chamber 1 and the packing containing assembly. The joints between the respective parts 3, 6 and 9 are suitably prepared to prevent leakage of either the packing or the liquid under pressure.

An annular passage 19, made in the body of the gland 3 intersects that face of the gland which is adjacent to the sleeve 6, so connecting with the helical grooves 22 made in the sleeve 6. The passage 20 is extended thru the gland 3 and terminates in a threaded hole, a sampler body 25 being screwed therein. The rotor 26 and a cap 25 are parts of the sampler which will be explained later in more detail. A dowel 10 aligns the gland 3 with the sleeve 6 so that a proper relation of parts is maintained. Referring now to Figure 3, the intersection of the helical grooves 22 with the end of sleeve 6 are indicated and the effect of the sharp lip 28 is also shown. The passage 20 is located between the surfaces of grooves 22 and the outer surface of the sleeve 6. The dowel hole 10a is the location for the dowel 10 shown in Figure 1.

A continuation of passage 19 leads thru the flange of the gland 3 and in an upward direction, ending in a threaded hole. A pipe 11 is threaded into the termination of passage 19, and then into a valve body 12, passage 19 thereby being continued from the gland 3 into the valve body 12. The upper part of the valve body 12 is formed into a reservoir, the outside of the latter being threaded to receive a cap 14. A needle valve 13 is also threaded into the valve body 12 and intersects the passage 19 so that the latter may be closed or opened. The cap 14 is threaded to receive an adjusting nut 16 thru which the piston rod 17 passes to be attached to the piston 15, the latter residing in the bore of the reservoir which has been formed in the body 12. A spring 18 provides means to vary the tension of the piston 15 against any material placed under it. The respective parts 12, 13, 14, 15, 16, 17 and 18 constitute a spring-loaded device to regulate the predetermined pressure.

Figure 4:
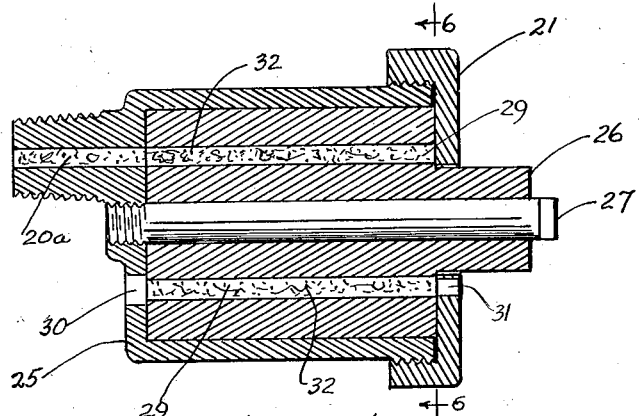
Figure 4 is a cross-section of the sampling device.

Referring now to Figure 4, a longitudinal cross-section of the sampler as before mentioned in the description of Figure 1, the body 25 is screwed into the terminating hole of the passage 20. Passage 20 is therefore continued by passage 20a. The body 25 contains a cylindrical rotor 26 held in place by a cap 21, threaded and screwed over a corresponding thread on the outside of the body 25. The ejection holes 30 and 31 are aligned so that passages 29, 30 and 31 are open thruout when so required. A centrally located pin 27 is a guide and indicator as will later be shown.

Figures 5, 6:
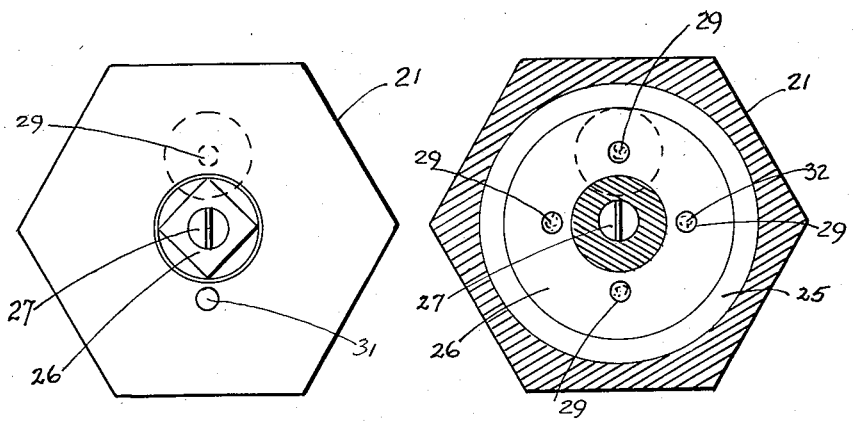
Figure 5 is an outer end view of the sampler.
Figure 6 is a cross-sectional view of the sampler.

In Figure 6 is shown a cross-section of Figure 4, exposing the multiple sampling ports 29. As the rotor 26 is revolved, any of the ports 29 are successively brought into alignment with the passage 20a, and rotor 26 may also be turned so that any of the passages 29 will align with ejection ports 30 and 31.

In Figure 5 is shown the cap 21 holding the rotor 26 in such a position that passage 29 continues the opening 20a. The guide pin 27, firmly attached to the body 25, forms a pointer to indicate when passages 29 and 20a are in line, as the cap 21 is solid. Ejection point 31 is shown in line with one of the passages 29.

Figure 7:
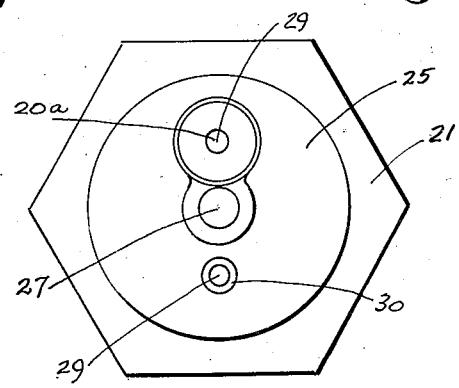
Figure 7 is an inner end view of the sampler.

Figure 7 shows an inner view, the bottom of the sampler, the passages 29 and 20a being in line, as are passages 29 and 30.

Referring now to my application for Letters Patent, Serial Number 533,430, dated April 28, 1931, the seventh law of friction, which states:

7. "Friction is inversely proportional to the rate of seepage flow at the surface of contact between a solid moving body and a porous elastic structure, up to the point of saturation."

Interpreted for plastic packing, the foregoing means that unless seepage under pressure can flow thru the packing, the friction will rise due to the tendency to occupy a larger volume, until the saturation point stops any further increase.

The usual method of using plastic packing is to force the material into grooves or reservoirs, the fact that a dense body having fine pores and interstices will become highly saturated, being overlooked. Plastic materials trap pressure and unless the material is in thin sections and intercommunication is established from one part to another, the pressure cannot drop uniformly, which results in blowing the material out at the points of the greatest pressure change. In Figure 1, the lands 23 and 24 are herein employed to break the continuity of the plastic body in a direction parallel to the pressure flow, which causes seepage to flow across each of the thin sections.

The arrangement being made so that seepage does flow, the usage of pressure reaction as later explained, is made possible, as where there is a drop of pressure in a packing section, friction is created by a net thrust in the direction of the unbalanced pressure. Saturation, as it affects plastic bodies, will overcome the foregoing mentioned effect.

In disclosing the operation of this device, the location and disposition of the plastic material 32 is indicated in Figures 1, 3, 4 and 6, such views apparently being ample for explanation. To start, the grooves 22 may be filled with a suitable plastic material before the sleeve 6 is inserted in the stuffing-box chamber 1. Or the needle valve 13 may be opened and the plastic be placed in the reservoir of the valve body 12 and forced thru the continuous passages 19, and so into grooves 22. Placed under pressure the plastic material will flow into all of the grooves 19 and be retained on the inner end of the sleeve 6 by the disc 9. The plastic will then flow into the passages 20 and 20a, so into passages 29, if the latter happen to be in line.

After the passages and grooves are filled with the plastic material the nut 16 may be adjusted so that sufficient pressure is maintained in the homogeneous body to correct the density changes effected under vibration of the machine and plunger. On reciprocating plungers, the pressure against the packing usually rises to a maximum beginning with that part of the stroke coincident with the opening of the discharge valves of the machine. The packing is therefore subjected to shock and must be arranged for a measure of flexibility. If the packing is too hard or too rigid it will not form a close contact with the plunger surface and leakage will result. If, however, either the packing structure is flexible, or its mechanical arrangement permits a movement under the shock, contact with the plunger and packing is close, friction is less and the packing will last longer.

In this invention employing a homogeneous mixture of packing materials, the density of the packing is maintained by the continuous right and left hand grooves. As the pressure rises, the plastic material in each groove is forced backward and at an angle with its original position; it also takes the thrust of pressure in a center line conforming with the direction of the groove. Undermining and washing by the liquid passing from one part of the plastic material to another is prevented by the lands 23 and 24 between each groove. Each section of plastic material forms a portion of a helical screw, each taking its share of the pressure and friction load.

When the shock of sudden pressure rise comes against this design of packing, the packing will be compressed in each groove and will move sideways from its original position, due to the pitch of the helical grooves 22. Thus the plastic is arranged mechanically so that as a structure it can move under shock, be rearranged momentarily, which is the equivalent of fabric flexibility. The plastic under this design will return to its normal position as quickly as the pressure is released.

Sudden high pressures cause leakage past plastic packing before the total area and volume of the packing is acted upon by the pressure to become saturated; and then when saturated, the volume increases and the packing cannot contract. That is, leakage occurs adjacent to the source of pressure action, before the pressure can saturate and change the shape or volume of the packing and force it against the rod. To stop this leakage along the rod, the sealing must be done at the source of pressure and practically coincident with the rise of pressure, to protect the packing from cutting and washing. In the helical grooves built according to this invention, the surface of each groove facing the source of pressure is formed into a lip having an acute angle with the rod surface, so that each section of material will be self-set against the rod by any unbalanced pressure at the point of contact. A component of such unbalanced pressure also acts at an angle with the surface of the rod coincident with the rise of pressure. Sealing of the packing at the source of pressure is never later than the rise of pressure and leakage is prevented. If a vacuum on intake strokes occurs before a pressure rise, the opposing lip will seal the joint. As both the faces of the grooves 22 and the lands 23 and 24 are lipped, all of the plastic packing ring sections are subjected to the self-setting action, and the reservoir should be disconnected by closing the needle valve 13 for intermittent or quickly changing pressures. The increase and decrease of saturation is assisted by the interposed lands which break the plastic body into sections, none of which may be considered continuous.

Plastic packing when confined in grooves becomes hard after a period of use, the finer particles are washed or rubbed away, the coarser particles remaining to form a "mat." The latter will score the rod and finally loose their original plasticity unless provisions are made to offset the inevitable changes mentioned. In the presence of high temperatures plastic packing becomes hardened due to deposits of carbon and other foreign materials in the machine and becomes inoperative in a short period of time, unless removed.

Another cause of plastic packing becoming inoperative when confined in grooves is the chemical reaction with the liquids handled. Deposits of chemicals out of solution are driven into the packing to form hard compositions unsuitable for packing purposes, due to the loss of flexibility.

In this invention, a sampling device is employed to enable the operator to determine how much packing should be removed and how often. When the sampling passages 29 are aligned with 20a, that much packing may be removed from the grooves 22, and from that point adjacent the source of pressure and temperature, where usage is hardest and hardening will occur first. New packing is injected by the loading device attached to the gland 3, which forces the used packing thru passages 29, the operations being simultaneous and done without hindering operation. After a revolution of rotor 26 has been made, each movement being accomplished by loosening the nut 21, then turning the rotor 26 to match another passage 29 with the opening 20a, a rod may be pushed thru the hole 31, so ejecting the sample of packing thru the hole 30 for examination.

In those processes of today involving charges of expensive material which must be processed for a stated interval without stopping operations, the machines handling the materials must not be stopped for change of packing.

It is to be believed that the arrangement of this invention will use plastic packing at its highest efficiency, convenience of injection and ejection, and be an assurance of continuous operation, so necessary in that class of work involving high pressure and temperatures, shock, and adverse chemical reaction.

The construction as shown is capable of many variations to meet local conditions, and such changes as are embodied in the following claims I do intend to be within the spirit of this invention.

I claim:

1. A stuffing-box formed around a rod with clearance for said rod, grooves formed in the surface of said stuffing-box wall, means to inject plastic packing materials into said grooves, means to maintain a predetermined pressure within said packing structure, an outlet passage from said grooves connected to a sampler device, said sampler device have a revolvable drum with multiple compartments therein which may be successively positioned to receive plastic packing from said grooves, the plastic packing confined in the compartments of said sampler to be ejected successively.

2. A stuffing-box formed around a rod with a clearance for said rod and subjected to a fluid medium under pressure, a right and a left handed helical groove formed in the surface of said stuffing-box wall, the sides of said grooves being undercut to form lips facing the source of said medium at an acute angle with the surface of said rod and inclining away from the source of said medium plastic packing in said grooves and means to exert uniform pressure upon said packing.

3. A stuffing-box formed around a rod with a clearance for said rod and subjected to a fluid medium under pressure, a right and a left hand helical groove formed in the surface of said stuffing-box wall, the sides of said grooves adjacent to the source of said medium being formed at an acute angle with the surface of said rod and inclining toward the source of said medium plastic packing in said grooves and means to exert uniform pressure upon said packing.

4. A stuffing-box formed around a rod with a clearance for said rod, a right and a left handed groove formed in the surface of said stuffing-box wall, the sides of said grooves being at an acute angle with the surface of said rod and converging toward said rod and means to force a plastic material through said grooves.

5. A stuffing-box formed around a rod with a clearance for said rod, multiple right and left handed grooves formed in the surface of said stuffing-box wall, the sides of said grooves converging toward the surface of said rod, means to feed plastic packing under pressure through said grooves and means to remove a sample of said packing as desired.

6. A stuffing-box formed around a rod with a clearance for said rod, helical grooves formed in the surface of said stuffing box wall, the sides of said grooves converging toward said rod surface, a reservoir containing plastic packing materials compressed to a predetermined degree, and means to force said plastics thru a passage to the helical grooves at said predetermined pressure.

7. A stuffing box formed around a rod with a clearance for said rod, helical grooves formed in the inner surface of the wall of said stuffing box, the sides of said grooves being formed at an acute angle with the surface of said rod, a reservoir containing plastic material compressed to a certain predetermined degree, said reservoir being connected to said grooves, and an outlet from said grooves connected with the end of said box remote from said reservoir from which packing may be removed.

HARLEY T. WHEELER.